UNITED STATES PATENT OFFICE.

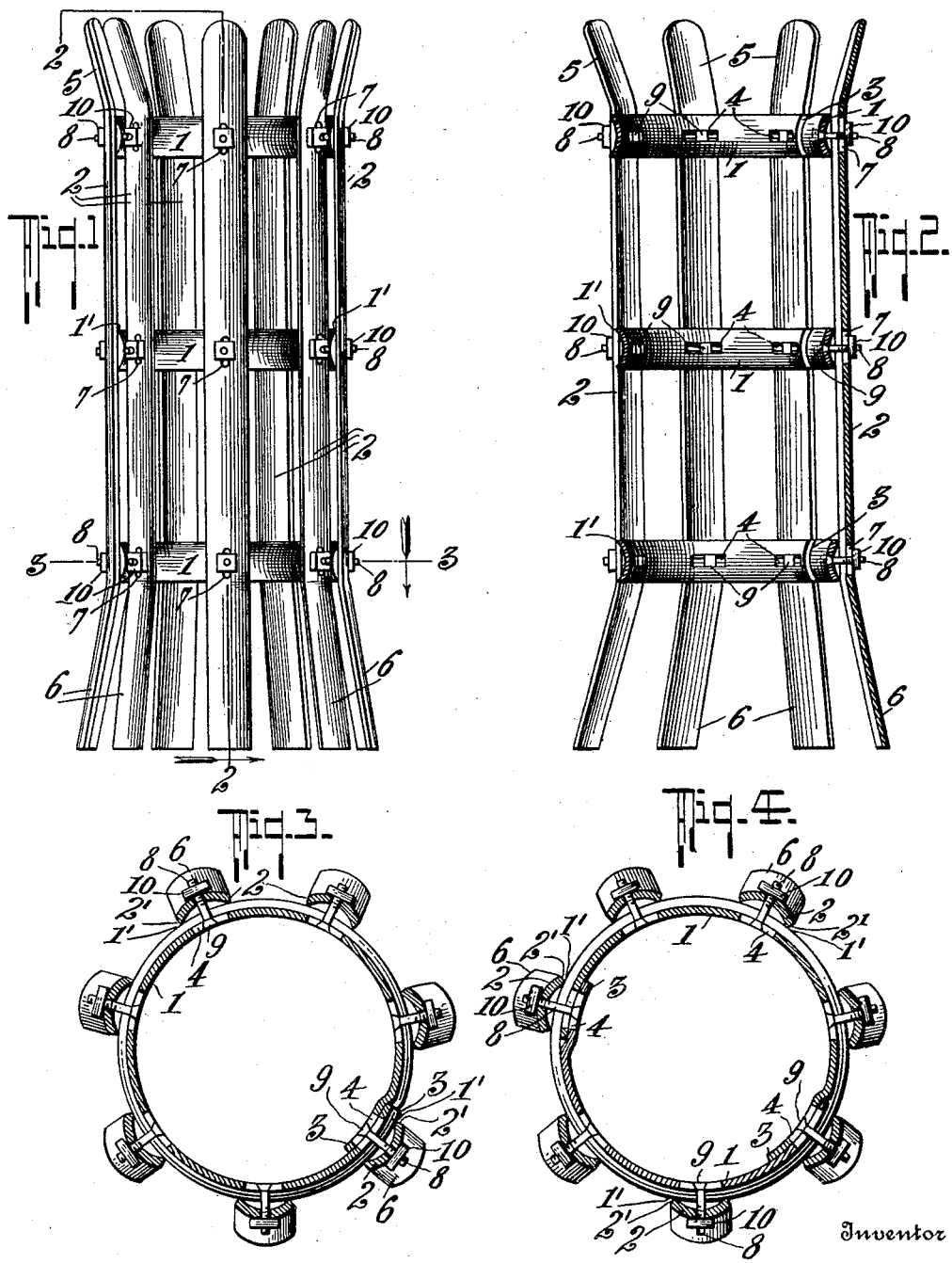
M. WEIXLER.
KNOCKDOWN TREE GUARD.
APPLICATION FILED DEC. 4, 1913.
1,116,961.
Patented Nov. 10, 1914.

MATHIAS WEIXLER, OF LOUISVILLE, KENTUCKY.

KNOCKDOWN TREE-GUARD.

1,116,961.  Specification of Letters Patent.  Patented Nov. 10, 1914.

Application filed December 4, 1913. Serial No. 804,698.

*To all whom it may concern:*

Be it known that I, MATHIAS WEIXLER, a citizen of the United States, residing at Louisville, in the county of Jefferson and State of Kentucky, have invented certain new and useful Improvements in Knockdown Tree-Guards; and I do declare the following to be a full, clear, and exact description of the invention, such as will enable others skilled in the art to which it appertains to make and use the same.

This invention relates to improvements in tree guards and more especially to those being provided with supporting means having no connection with the tree.

The primary object of the invention is to provide a simply constructed device of this character provided with ground anchors whereby the same is retained in a truly vertical position and an efficient brace for the tree is provided.

A secondary object is to construct the guard in a manner which will render its parts readily detachable for storing or shipment.

With the above objects in view, the invention resides in certain novel features of construction and combination herein described and claimed and shown in the drawings wherein:—

Figure 1 is a side elevation of my improved tree guard; Fig. 2 is a vertical section on the line 2—2 of Fig. 1; Fig. 3 is a horizontal section on the line 3—3 of Fig. 1; and Fig. 4 is a horizontal section showing a different form of hoop which is employed when the device is applied to large trees.

In the embodiment illustrated, I have shown my improved tree guard as comprising in general, a plurality of hoops 1 and palings 2, said palings being removably and adjustably secured to said hoops.

Coming now, more particularly, to the form of the invention shown in Figs. 1 to 3 inclusive, each hoop 1 is shown as being formed of a single strip of metal bent transversely to render said hoops concavo-convex in cross section. The meeting ends 3 of the hoops are overlapped as will be clearly seen by reference to Fig. 3 and said hoops are provided at intervals around their circumference with lateral slots 4 for a purpose to appear. The palings 2, above mentioned, are also formed of single strips of metal bent transversely so that the shape of these palings, like that of the hoops, 1, is concavo-convex in cross section. The palings 2 have their upper ends bent outwardly as at 5 for the sake of ornamentation while their lower ends deflect outwardly as at 6 and are adapted to be embedded in the soil around the tree. Vertical slots 7 are spaced at suitable intervals throughout the lengths of the palings 2 for a purpose to appear. By reference to the several views in the drawings, it will be seen by the specific shape of the hoops 1 and the palings 2, that co-acting biting edges 1′ and 2′ are formed on said hoops and said palings respectively. The above mentioned biting edges, when the parts are assembled, are held in binding yieldable contact with each other by means of bolts 8 having their heads 9 countersunk in the slots 4 of the hoops 1, their shanks extending through the registering slots 4 and 7 and receiving nuts 10, which nuts when tightened, will cause the contacting portions of the hoops 1 and the palings 2 to be slightly flattened. This action not only binds the above mentioned members tightly together but exerts a locking action upon the nuts 10 thereby preventing them from becoming loosened. After excessive use should the biting edges 1′ and 2′ become worn at the points where they contact, the nuts 10 may be loosened and the hoops 1 and the palings 2 may be adjusted relatively to each other thereby providing new and independent biting edges which will again effectively secure the parts in assembled position.

The form of my invention, so far described, is adapted for use in connection with trees of small diameters, it being possible to spring the ends 3 of the hoops 1 apart and pass said hoops over the trunks of said trees after which they may be secured together as shown.

The form of my invention shown in Fig. 4, is adapted for use around trees of rather large diameter and I therefore construct the hoops 11 in two sections, said sections being secured together by the fastening bolts 8 in a manner clearly illustrated in this figure.

Although I have shown the hoops and the palings 2 as formed by bending metal transversely, it will be understood that, under the scope of the appended claims, I may form the above mentioned members of flat pieces of metal channeled or grooved transversely to provide biting edges similar to the ones above described.

By the above described construction and arrangement of parts, it will be readily seen that I have produced a very simple, strong and efficient tree guard which may readily be knocked down or disassembled for storing or shipping and which when assembled, will require no bracing other than the action of the above mentioned biting edges 1' and 2' and the clamping bolts 8.

Although I have described my invention with considerable minuteness, I do not wish to be limited to details other than those amplified in the appended claims.

What I claim as my invention is:—

1. A knock-down tree guard comprising, a plurality of resilient hoops disposed one above another, and resilient palings longitudinally grooved to provide biting edges, the biting edges of said palings being adjustably held in binding yieldable contact, with said hoops.

2. A knock-down tree guard comprising, a plurality of resilient hoops peripherally grooved to provide biting edges and disposed one above another, and spaced palings adjustably held in binding contact with the biting edges of said hoops.

3. A knock-down tree guard comprising, a plurality of resilient hoops grooved peripherally throughout their entire width to provide biting edges and disposed one above another, and resilient palings vertically grooved to provide co-acting biting edges, the biting edges of said palings and said hoops being adjustably held in binding yieldable contact.

4. A knock-down tree guard comprising, a plurality of resilient hoops disposed one above another and provided with adjusting slots at intervals around their circumference said slots lying parallel to the sides of said hoops, palings disposed at intervals around said hoops and provided with vertical adjusting slots registering with the lateral slots in said hoops, said hoops and said palings being concavo-convex in cross section and having the edges of their concave faces in contact, bolts having their heads countersunk in the slots of the hoops and their shanks passing through said registering slots, and nuts on said bolts for drawing said palings and said hoops into binding yieldable contact.

5. A tree guard comprising a plurality of hoops disposed one above another and provided with adjusting slots at intervals around their circumference, said slots lying parallel to the sides of said hoops, palings disposed at intervals around said hoops and provided with vertical adjusting slots registering with the slots in said hoops, said hoops and said palings being grooved on adjacent faces to provide biting edges, bolts passing through the registering slots in said hoops and palings, and nuts on said bolts.

In testimony whereof I have hereunto set my hand in presence of two subscribing witnesses.

MATHIAS WEIXLER.

Witnesses:
KATE SULLIVAN,
NELLIE P. SULLIVAN.

---

Copies of this patent may be obtained for five cents each, by addressing the "Commissioner of Patents, Washington, D. C."